Sept. 6, 1927. 1,641,404
I. M. WASHINGTON
CONCRETE PLAQUE AND METHOD OF MAKING SAME
Filed Oct. 24, 1924
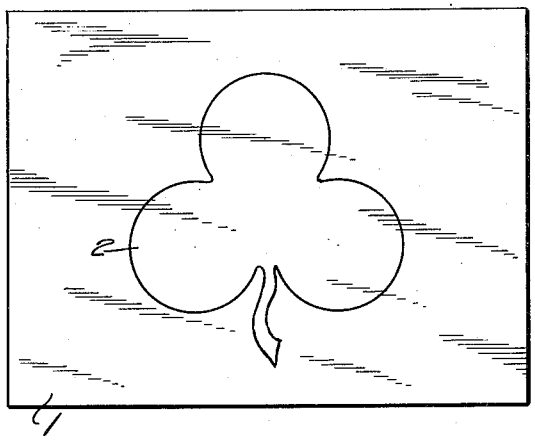
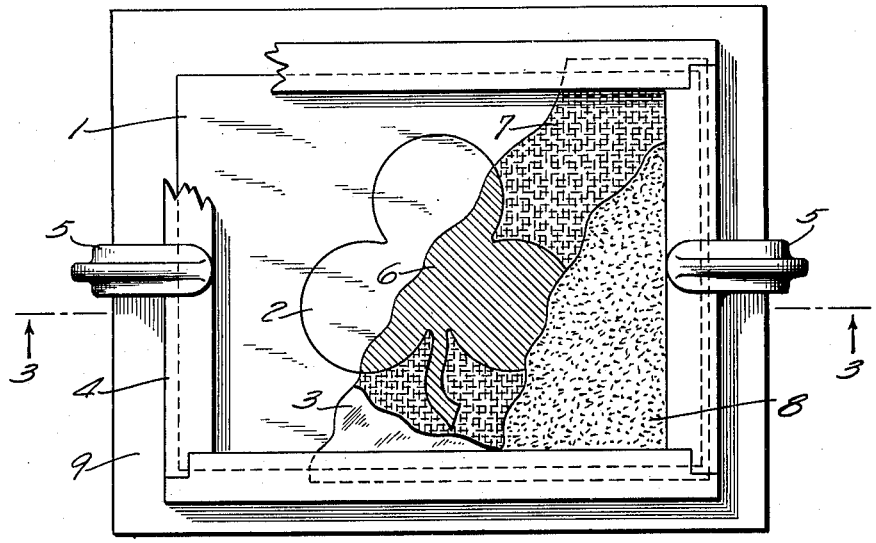
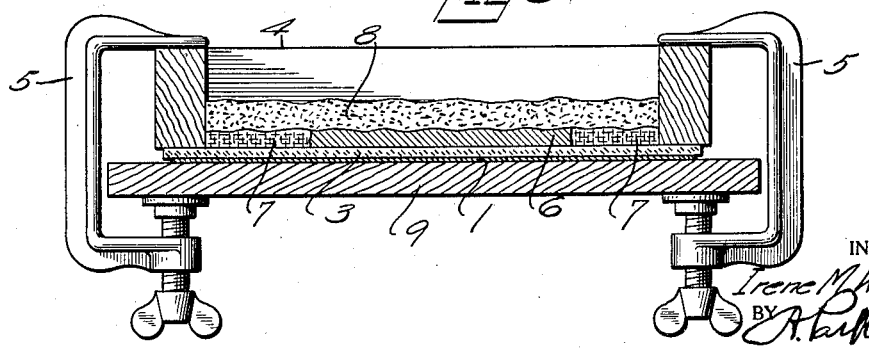
INVENTOR
Irene M Washington
BY
ATTORNEY Patented Sept. 6, 1927.

1,641,404

UNITED STATES PATENT OFFICE.

IRENE MARTHA WASHINGTON, OF BROOKLYN, NEW YORK.

CONCRETE PLAQUE AND METHOD OF MAKING SAME.

Application filed October 24, 1924. Serial No. 745,600.

My invention relates to the production of plaques having any desired design appearing in colors on the surface thereof, and comprises a method of producing such plaques without the use of heat, or the firing operation usual in the ceramic art. Said method consists essentially in rendering the desired design visible on a smooth, water repellant surface such as may be produced by placing a glass plate over a sheet of paper or other material on which the design appears, then mixing pigments of the colors appearing in said design separately with separate masses of substantially neat hydraulic cement, placing said colored cement masses on separate areas of the glass plate over the portions of the design below, corresponding thereto in color, supplying any proper backing, allowing the cement masses to set thoroughly under water while still in contact with said glass plate and thereafter removing the plaque so formed from said glass plate. One method of carrying out my invention is illustrated in the accompanying sheet of drawings in which, Fig. 1 shows a sheet of paper with a simple design of a clover leaf appearing thereon.

Fig. 2 is a plan view of said design with the superposed glass plate, colored cement masses and additional parts being broken away, and Fig. 3 is a cross section on line 3—3 of Fig. 2.

Throughout the drawings like reference characters indicate like parts: 1 is a sheet of paper on which the representation of a clover leaf 2 appears in green on a yellow background. 3 is a superposed plate of glass; 4 is a rectangular frame of wood or metal held by clamps 5, 5, to the glass plate and preferably also to the sheet of paper beneath it. 6, 6, represent masses of hydraulic cement mixed with a green pigment placed on the glass plate over the sections of the design which are colored green, and 7, a mass of such cement mixed with a yellow pigment which extends over those portions of the design colored yellow. 8 represents a thicker backing preferably formed of concrete containing about three parts of sharp sand intimately mixed with hydraulic cement. 9 is a board on which the foregoing parts are assembled.

In operating according to my invention to reproduce in cement the design shown in the drawings, I clamp together the glass plate 3 and frame 4 to form a mold for the completed plaque, place said plate on the paper 1 and, after the pigments are mixed with neat cement and the amount of water needed to form a fairly stiff mass which shall, however, contain at least the theoretical amount of moisture necessary to combine with the cement in the usual process of hydration or setting, place these colored masses either by hand or with any suitable tool on the glass plate, the area of green cement masses 6, 6, being delimited to correspond exactly with the outline of the green petals of the clover leaf below the glass and the yellow masses 7 being filled in over the intervening and surrounding spaces. The concrete backing 8 is next added in quantity sufficient to fill the rest of the space in the mold and to form a plaque of the desired thickness. The cement body so formed, still in contact with the glass plate, is then immersed in water and allowed to remain submerged until it has set completely. This makes the plaque so formed self supporting, and its surface absolutely glassy in appearance. The clamps 5, 5, are then taken off and the plaque freed from the glass plate and frame 4. As the surface of the glass plate is free from oil or other foreign matter, the cement fits smoothly against it and maintains this relation during the setting process. The two materials, glass and cement, thus maintaining such intimate contact during the hardening of the cement, the resultant surface of the plaque or tile so formed is glazed, and absolutely vitreous in appearance.

As a result of my above described process there is produced an integral cement plaque which is most artistic and suitable for decorative purposes, having a perfectly smooth face like glass in which are inlaid masses of colored cement exactly conforming in outline to the original design. To make sure that the outlines of the various colored segments are sharply preserved, mineral pigments preferably should be used which will not be attacked by the lime or other constituents of the hydraulic cement, and consequently will be insoluble in the moist cement. In this way any running of the colors at the edges of different sections of the design can be prevented.

The advantages of my invention comprise the simplicity of the operations involved which require no artistic skill or training, the accuracy of reproduction of the design, the glazed surface produced on the resulting plaque, the possibility of reproducing a design or picture without injuring the original, which is covered and protected by the glass plate during the operation, the cheapness of materials and apparatus required and the indestructible character of the resultant plaque which is an integral body of concrete faced with colored Portland cement which is also an integral part thereof. There is no possibility of the different colored sections of the plaque cracking away one from the other, or dropping away from the backing, and the face of the plaque is absolutely smooth and free from cracks or depressions in which dirt or other discoloring material might collect. The set hydraulic cement bodies will increase in hardness with age, and, because of the economy and ease of working, large slabs can be made to serve as facings for walls or floors of the most durable and sanitary character.

Obviously other cements might be substituted for Portland cement, if a plaque of greater heat resisting quality, or other special character, were desired.

Having described my invention, I claim:

1. The herein described process of reproducing a given design in a colored cement tile or plaque, which process comprises the following steps: placing a glass plate over said design, arranging moist masses of differently colored hydraulic cement on said glass plate over the respective portions of the design to be reproduced in the colors of the mass so placed thereover, immersing said cement and glass plate in water until the cement is set and then removing the plaque so formed from said glass plate whereby the said design is reproduced in corresponding colors upon the extremely smooth glazed plane surface of the resultant plaque.

2. A process such as set out in claim 1 in which the cement is colored by mixing therewith pigments insoluble therein.

3. The herein described process of reproducing a given design in a colored cement tile or plaque, which process comprises the following steps: placing a glass plate over said design, arranging moist masses of differently colored hydraulic cement on said glass plate over the respective portions of the design to be reproduced in the colors of the mass so placed thereover, adding a backing of moist concrete containing hydraulic cement, immersing the mass so formed, while still in contact with said glass plate, in water until the cement is set and then removing the plaque so formed from said glass plate whereby the said design is reproduced in corresponding colors upon the extremely smooth glazed plane surface of the resultant plaque.

IRENE MARTHA WASHINGTON.